United States Patent
Karasawa

[19]
[11] Patent Number: 6,144,665
[45] Date of Patent: Nov. 7, 2000

[54] SUBSCRIBER NETWORK SYSTEM

[75] Inventor: Satoru Karasawa, Tokyo, Japan

[73] Assignee: OKI Electric Industry Co., Ltd., Tokyo, Japan

[21] Appl. No.: 08/807,460

[22] Filed: Feb. 27, 1997

[30] Foreign Application Priority Data

Feb. 29, 1996 [JP] Japan ................................ 8-069282

[51] Int. Cl.[7] .................................................. H04L 12/28

[52] U.S. Cl. ............................................. 370/395; 370/446

[58] Field of Search ..................................... 370/395, 410, 370/242, 243, 244, 248, 250, 407, 446

[56] References Cited

U.S. PATENT DOCUMENTS

| | | | |
|---|---|---|---|
| 5,036,489 | 7/1991 | Theobald | 365/75 |
| 5,323,389 | 6/1994 | Bitz et al. | 370/410 |
| 5,412,649 | 5/1995 | Hummel | 370/395 |
| 5,539,564 | 7/1996 | Kumozaki et al. | 359/161 |
| 5,663,959 | 9/1997 | Nakagawa | 370/528 |
| 5,673,312 | 9/1997 | Andruska et al. | 370/385 |
| 5,712,847 | 1/1998 | Hata | 370/410 |
| 5,732,069 | 3/1998 | Nagino et al. | 370/219 |
| 5,818,842 | 10/1998 | Burwell | 370/397 |
| 5,864,555 | 1/1999 | Mathur et al. | 370/419 |

OTHER PUBLICATIONS

Yoshihiro Takigawa, Shin'ichi Aoyagi, and Eiji Maekawa, "ATM based Passive Double Star system offering B–ISDN, N–ISDN, and POTS", 1993, NTT Transmission Systems Laboratories, IEEE, 1993, pp. 14–18.

Primary Examiner—Hassan Kizou
Assistant Examiner—Daniel Previl
Attorney, Agent, or Firm—Rabin & Champagne, P.C.

[57] ABSTRACT

It is an object of this invention to provide a subscriber network system which can perform the system control operation. In the system where the optical network unit 10 and the subscriber line terminal 20 use the ATM transmission mode, a PDS-OAM cell, similar in format to an ATM cell, is defined for use in the system control operation. When control information is sent from the subscriber line terminal 20 to the optical network unit 10, the control cell generation module 22 generates a PDS-OAM cell containing control information and sends this cell to the optical network unit 10. The optical network unit 10 causes the control cell termination module 17 to terminate the PDS-OAM cell sent from the subscriber line terminal 20. The control cell generation module 14 generates a PDS-OAM cell containing a response to the control information from the subscriber line terminal 20 or warning information generated within the optical network unit 10 and sends this cell to the subscriber line terminal 20. The subscriber line terminal 20 causes the control cell termination module 24 to terminate the PDS-OAM cell sent from the optical network unit 10.

4 Claims, 6 Drawing Sheets

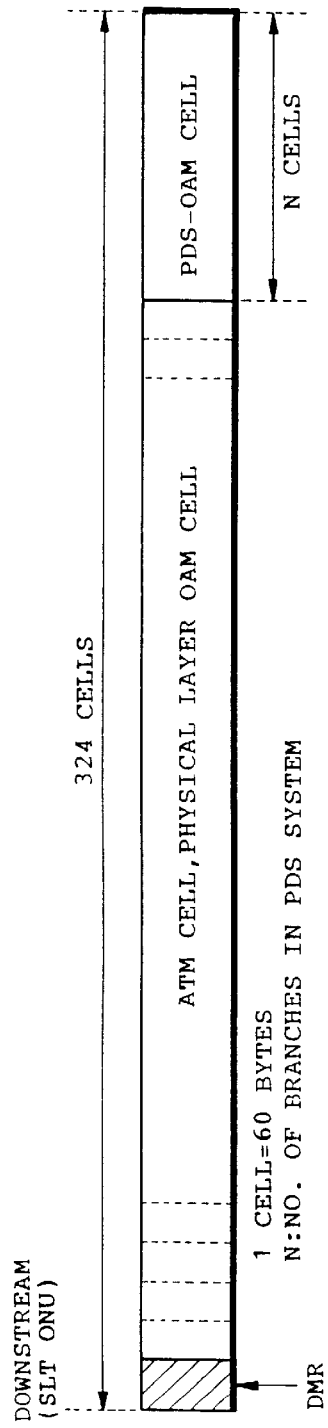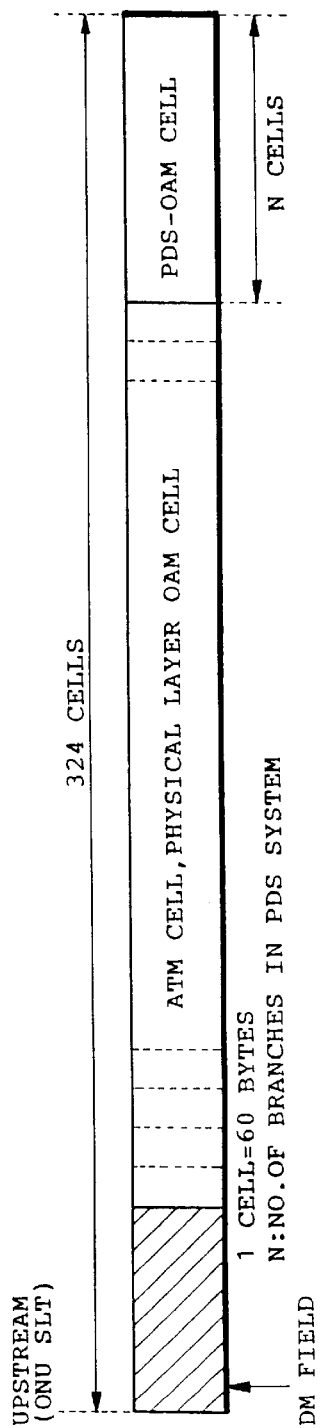

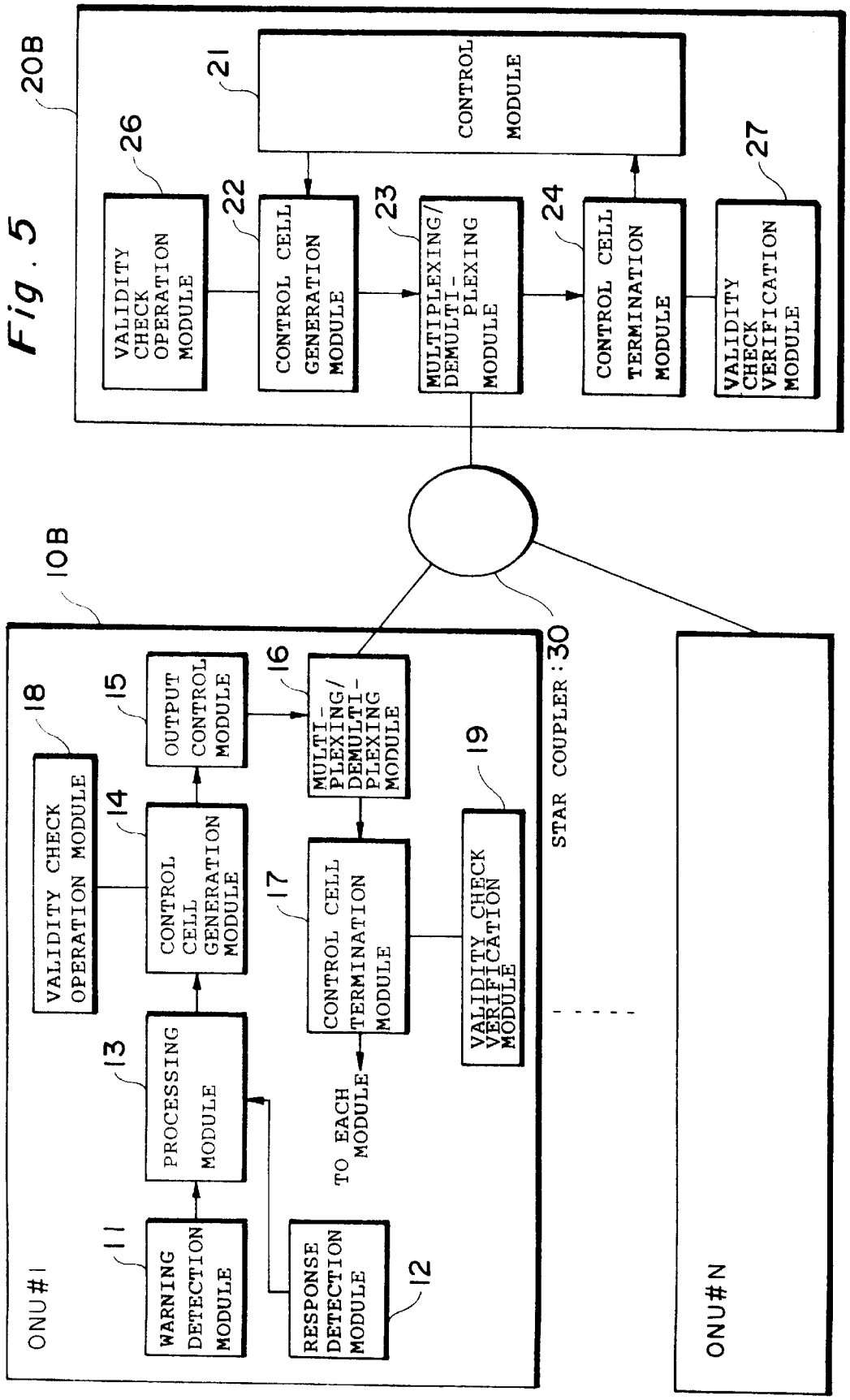

SUBSCRIBER NETWORK SYSTEM

BACKGROUND OF THE INVENTION

1. Field of the Invention

The present invention relates to a subscriber network system using the ATM (Asynchronous Transfer Mode) transmission mode.

2. Description of the Prior Art

A subscriber network system is thought of as a system capable of high-speed, broad-band communication, with fiber optic cables installed to subscriber homes. Today, a Passive Double Star (PDS) system is the most promising candidate for this subscriber network system because it is lowcost. However, many problems must be solved to realize a PDS system. One of them is a system control problem.

One of the documents which describe this system control is "ATM based Passive Double Star System offering B-ISDN, N-ISDN, and POTS", by Y. TAKIGAWA et. al., GLOBCOM '93, pp. 14–18 (December 1993). This document describes how to transmit signals in a PDS system using the ATM transmission technique.

However, the above document does not describe the technique for system control; it only describes physical layer OAM cells. Normally, these physical layer OAM cells are provided for detecting and indicating abnormal conditions, such as signal disruptions or duplications, or for sending error information to a connection termination point, but not for the system control operation. For example, in the conventional system, information on a subscriber unit installed at a subscriber home is not sent to the local switch, nor is control information sent from the local switch to a subscriber home.

Another method of controlling the system is to use a fixed area within a frame. This cannot be used in multimedia communication for the following reason. Multimedia communication requires the broad-band transmission mode which, in turn, requires the ATM transmission technique. However, in the ATM transmission technique, it is impossible to reserve a fixed area within a frame for use as the system control operation.

In view of the foregoing, the realization of a configuration for controlling the system has long been awaited.

SUMMARY OF THE INVENTION

It is an object of the present invention to provide a configuration in which a subscriber unit (hereafter called an optical network unit) can send unit status information to a local switch (hereafter called a subscriber line terminal) and, at the time, a subscriber line terminal can send control information to an optical network unit in a subscriber network system.

To achieve this object, the configuration according to the present invention uses the asynchronous transfer mode, and defines control cells for sending unit status information from an optical network unit to a subscriber line terminal and for sending control information from a subscriber line terminal to an optical network unit.

The configuration according to the present invention allows an optical network unit to send unit status information to a subscriber line terminal and, at the same time, a subscriber line terminal to send control information to an optical network unit.

DESCRIPTION OF THE DRAWINGS

The present invention will be understood more fully from the detailed description and the accompanying drawings below of the preferred embodiments of the invention.

In the drawings:

FIGS. 2A abd 2B are diagrams showing the frame format used in the subscriber network system according to the present invention.

FIG. 5 is a diagram showing the configuration of the third embodiment of the subscriber network system according to the present invention.

DESCRIPTION OF THE PREFERRED EMBODIMENTS

Referring to the attached drawings, there is shown an embodiment according to the present embodiment.

First Embodiment

In the first embodiment, the PDS system is used as a subscriber network system, and a control cell is called a PDS-OAM cell. This PDS-OAM cell, similar in format to an OAM cell used in ATM, has the PDS header added to the OAM that is used in ATM.

To collect the unit status information on an optical network unit from a subscriber line terminal, the control cell generation module in the subscriber line terminal generates a PDS-OAM cell. The subscriber line terminal sends this cell to the optical network unit.

Upon receiving the PDS-OAM cell, the optical network unit terminates it with the use of control cell termination module and gets the unit status collection request signal. The processing module of the optical network unit performs unit status check processing, based on the signal indicating the unit status condition detected within the unit. For example, the module accumulates the number of error bits or identifies error locations. Then, the control cell generation module receives the result of unit status check processing from the processing module, stores it in an upstream PDS-OAM cell, and sends it to the transmission line.

Upon receiving the PDS-OAM cell from the optical network unit, the subscriber line terminal terminates it with the use of the control cell termination module. It then gets the unit status information stored in the PDS-OAM cell and sends it to the higher layer.

As described above, a control cell is used in the first embodiment to send unit status information from an optical network unit to the subscriber line terminal, and control information from the subscriber line terminal to an optical network unit. This makes it possible for the system to do the system control operation on the optical network unit and the subscriber line terminal. In addition, the system in the first embodiment uses a PDS-OAM cell, similar in format to an ATM cell, to do the system control operation. This means that the system control operation, which does not require a special ATM transmission mode, can be done in a simple configuration. The control cell termination module terminates the PDS-OAM cell, eliminating the need for the higher-level layer to do special processing for PDS-OAM cells. The processing module of the optical network unit, which performs unit status check processing, reduces the load on the subscriber line terminal.

Figure 1:
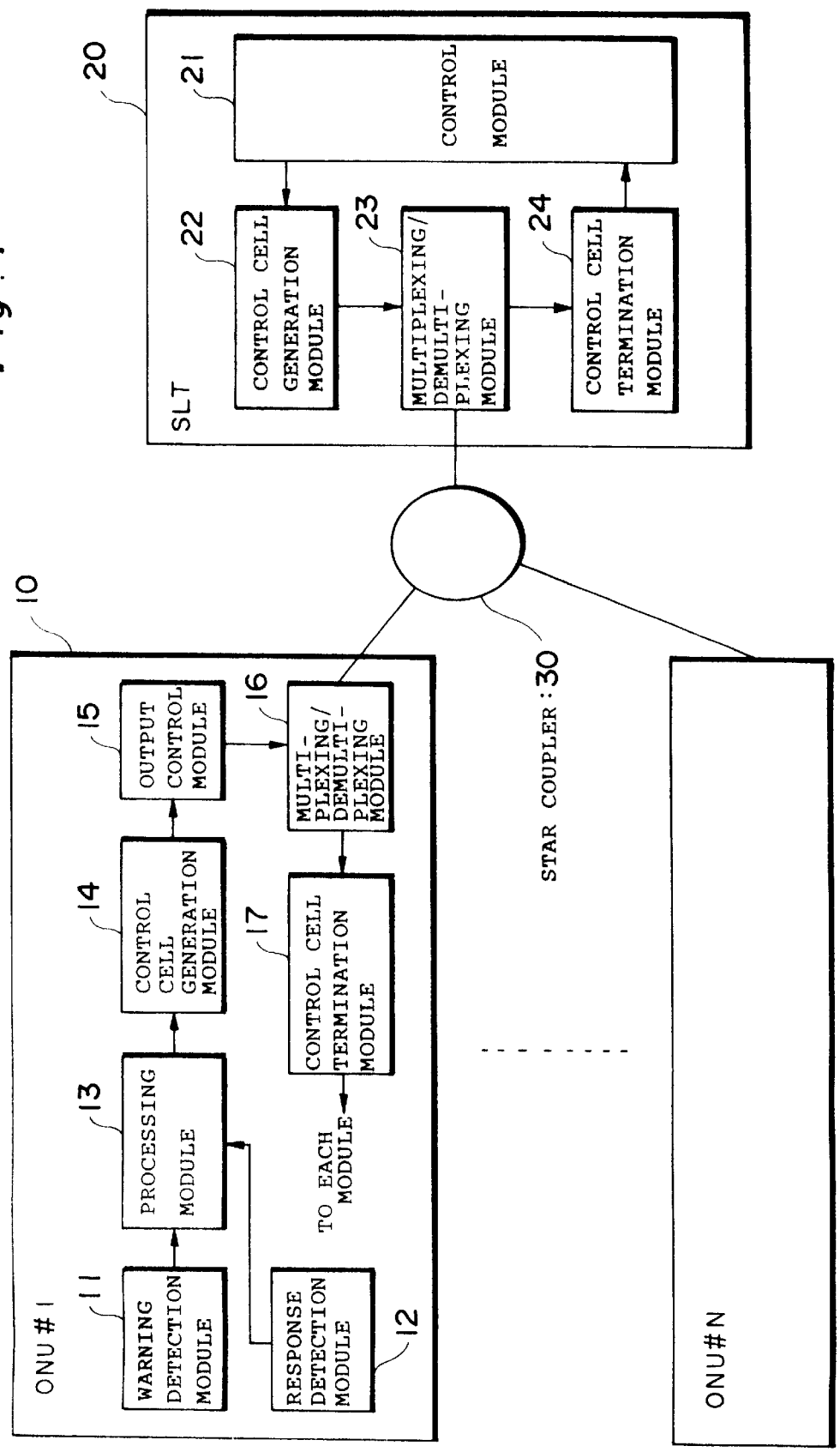
FIG. 1 is a diagram showing the configuration of the first embodiment of the subscriber network system according to the present invention.

FIG. 1 is a diagram showing the configuration of the first embodiment of a subscriber network system according to the present invention.

The system in the figure, a PDS subscriber network system, has a plurality of Optical Network Units (ONUs) #1-#N connected via the star coupler 30 to the Subscriber Line Terminal (SLT). Because there is only one transmission line from the star coupler 30 to the SLT in the PDS system, the ONUs send cells according to the timing signal from the SLT. In the figure, the ONU corresponds to the optical network unit 10 and the SLT corresponds to the subscriber line terminal 20.

In this embodiment, the system control operation includes the monitoring of a warning condition detected within an ONU and the control of ONU internal operations. Note that the upstream (ONU --> SLT) cell output timing is controlled independently. The configuration and operation of this control mechanism is not described here because it is not related to this embodiment.

The optical network unit 10 (ONU#1-ONU#N) each have the warning detection module 11, response detection module 12, processing module 13, control cell generation module 14, output control module 15, multiplexing/demultiplexing module 16, and control cell termination module 17.

The warning detection module 11 monitors the unit if it operates normally, monitors the transmission line, and checks for errors. The response detection module 12 detects a response to a control request sent from the subscriber line terminal 20 to the optical network unit 10. The processing module 13 receives a warning condition detected by the warning detection module 11 or a response to a control request detected by the response detection module 12, and accumulates the number of error bits or identifies error locations.

The control cell generation module 14 generates a control cell (PDS-OAM cell) containing the processing results of the processing module 13. The output control module 15 outputs cells in a pre-determined timing. The multiplexing/demultiplexing module 16 multiplexes non-control cells and control cells in time-division mode and, at the same time, demultiplexes its own cells from the cell flow received from the subscriber line terminal 20. The control cell termination module 17 selects PDS-OAM cells from its own cells demultiplexed by the multiplexing/demultiplexing module 16.

The subscriber line terminal 20 consists of the control module 21, control cell generation module 22, multiplexing/demultiplexing module 23, and control cell termination module 24. The control module 21 performs various types of control; it sends warning collection instructions to the optical network units 10, and performs subscriber line terminal control operations according to the contents of warnings sent from the optical network units 10. The control cell generation module 22 generates PDS-OAM cells according to an instruction from the control module control module 21 just as the control cell generation module 14 of the optical network unit 10. The multiplexing/demultiplexing module 23 multiplexes cells to be sent to the optical network units 10 and, at the same time, demultiplexes cells for each optical network unit 10 from the received cell flow. The control cell termination module 24 terminates a received PDS-OAM cell, detects a warning or a response in the PDS-OAM cell, and sends it to the control module 21.

FIGS. 2A and 2B show the format of a frame transferred between the optical network unit 10 and subscriber line terminal 20.

The PDS-OAM cells, provided as cells independent of the physical layer OAM cells, contain control information to be sent to an ONU. One frame consists of 324 cells, and N cells out of them are used for the PDS-OAM cell field. "N", the number of branches in the PDS system, corresponds to the number of optical network units 10 (number of branches from the star coupler 30) shown in FIG. 1. The DMR field of the downstream (SLT -->ONU) frame is the Delay Measurement Request signal field, while the DM field of the upstream (ONU -->SLT) frame is the Delay Measurement signal field. These fields are used to measure the signal delay in each optical network unit 10. These fields are not described here because they are not related to the present invention.

The following explains how to collect warning information from the optical network unit 10. In the following discussion, information is collected from ONU#1.

To collect warning information on the optical network unit 10 (ONU#1), the subscriber line terminal 20 causes the control module 21 to send the warning information collection request signal to the control cell generation module 22. The control cell generation module 22 stores the warning collection request information in the payload field of the PDS-OAM cell to be sent to ONU#1, and sends it to the transmission line.

Figure 3A:
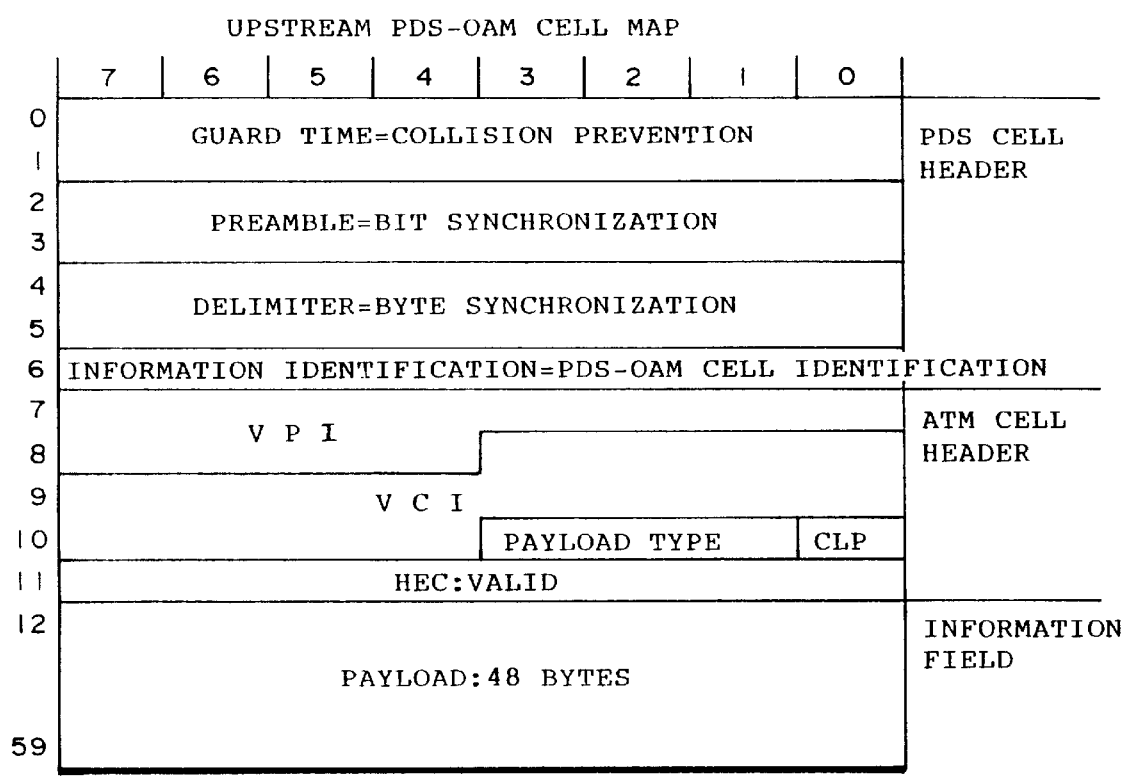
FIGS. 3A and 3B are diagrams showing the PDS-OAM cell format used in the subscriber network system according to the present invention.
Figure 3B:
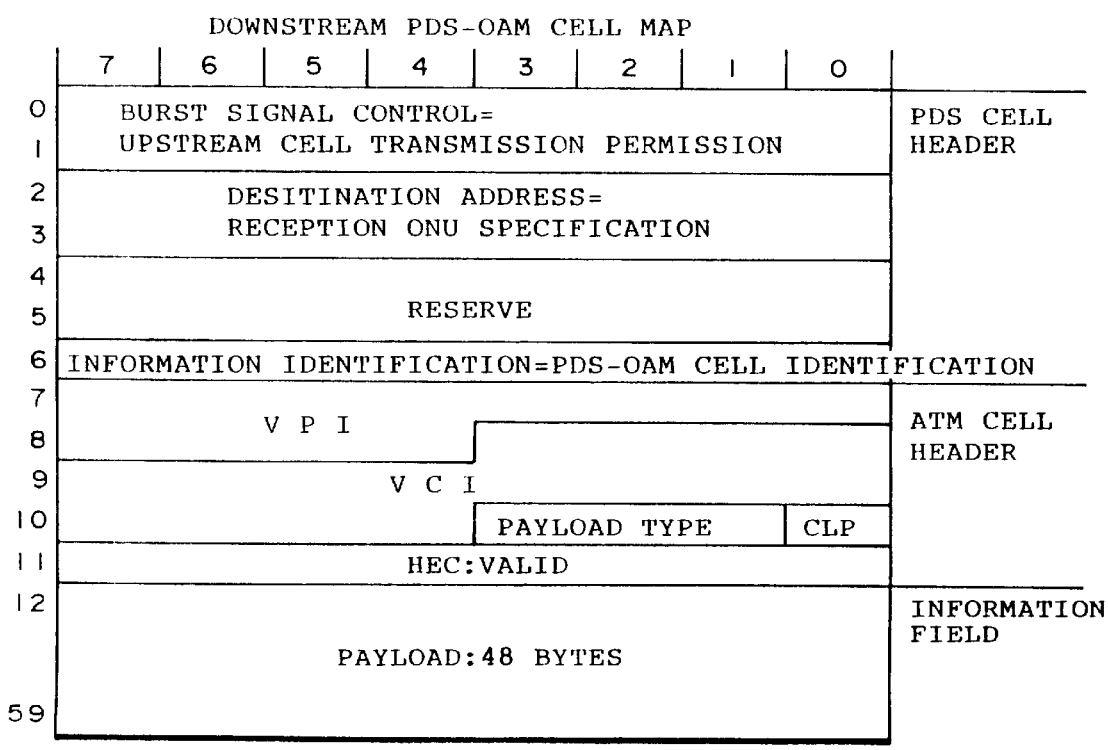

FIGS. 3A and 3B show the format of the PDS-OAM cell. The control cell generation module 22 stores the address of ONU#1 into the destination address (DA) field of the PDS cell header, and sends the PDS-OAM cell to the transmission line.

ONU#1 causes the control cell termination module 17 to detect, via the multiplexing/demultiplexing module 16, a PDS-OAM cell sent to this optical network unit, and gets the warning collection request signal stored in the payload field. On the other hand, the warning detection module 11 of the optical network unit 10 monitors the unit and the transmission line for errors. The processing module 13 receives the monitor result from the warning detection module 11, accumulates the number of error bits, identifies error locations, and sends the processing result to the control cell generation module 14 to respond to the warning collection request. Then, the control cell generation module 14 stores the received processing result into the payload field of the upstream PDS-OAM cell. The PDS-OAM cell is output to the transmission line in response to setting of the BSC (Binary Synchronous communications) data by the subscriber line terminal 20 and controlling by the output control module 15.

The subscriber line terminal 20 receives the PDS-OAM cell via the multiplexing/demultiplexing module 23, gets the warning information stored in the payload field, and sends it to the control module 21.

As described above, the subscriber network system in the first embodiment has the control cell for sending unit status information from the optical network unit 10 to the subscriber line terminal 20 and for sending control information from the subscriber line terminal 20 to the optical network unit 10. With this control cell, the subscriber network system can do the system control operation. For example, the system can use this control cell to send error information on the transmission line between the optical network unit 10 and the subscriber line terminal 20 to the subscriber line terminal 20 or to send control information from the subscriber line terminal 20 to the optical network unit 10.

The PDS-OAM cell, similar in format to other cells used by the user, does not require any modification of the ATM transmission mode. In addition, the control cell termination module 24, which terminates the PDS-OAM cell, eliminates the need for a higher-level layer to do special processing for the PDS-OAM cell. That is, the layers higher than the ATM layer can process the PDS-OAM cell as a normal ATM OAM cell.

In addition, the processing module 13 of the optical network unit 10 checks the unit status and stores it in the PDS-OAM cell in the first embodiment. Thus, the PDS-OAM cell, which is sent to the subscriber line terminal 20, informs the subscriber line terminal 20 of the unit status of the optical network unit 10, reducing the load on the subscriber line terminal.

Second Embodiment

In the second embodiment, the unit status check processing that is performed in the optical network unit 10 in the first embodiment is performed in the subscriber line terminal 20.

Figure 4:
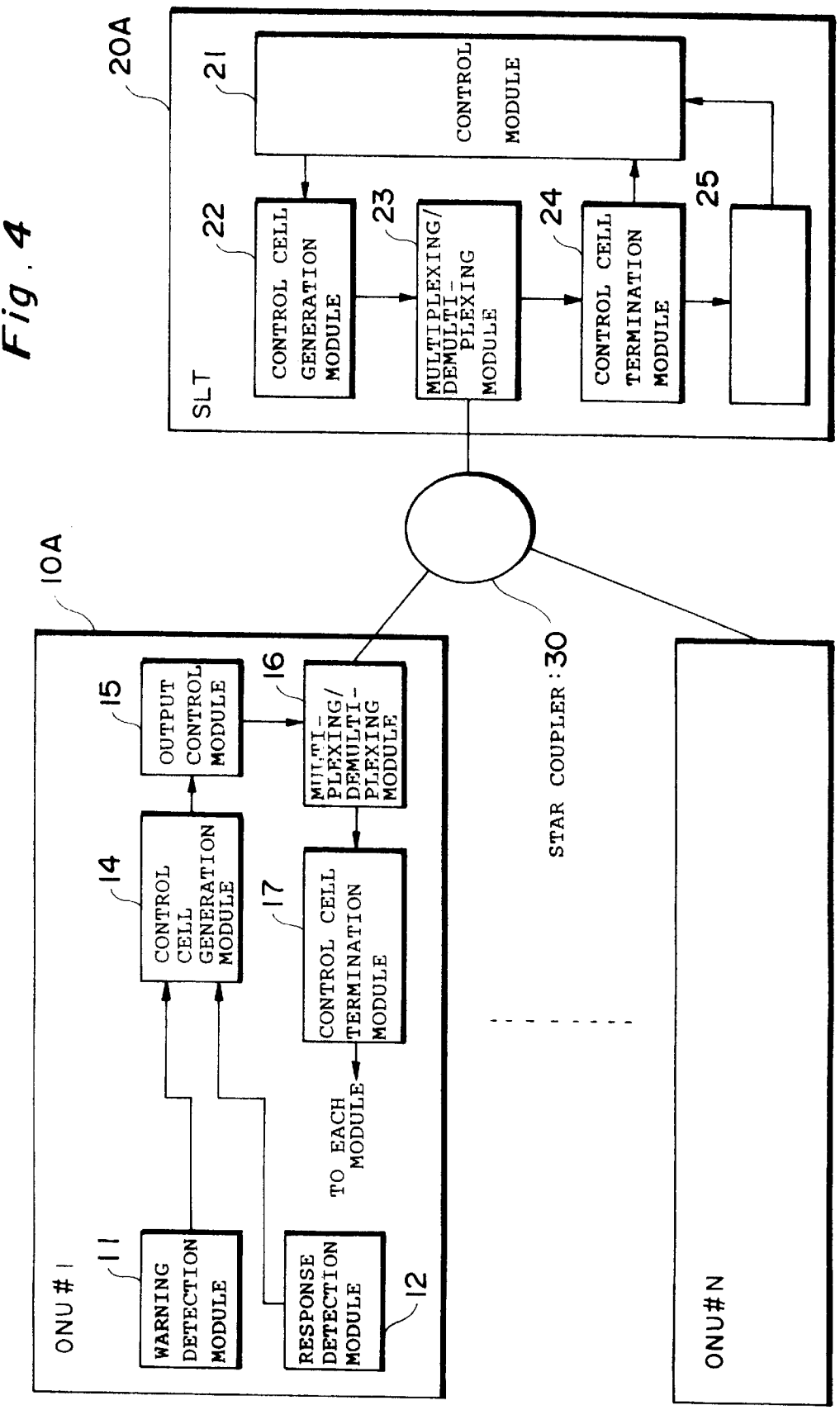
FIG. 4 is a diagram showing the configuration of the second embodiment of the subscriber network system according to the present invention.

FIG. 4 is a diagram showing the configuration of the second embodiment of a subscriber network system according to the present invention.

The system shown in the figure consists of the optical network unit 10A, subscriber line terminal 20A, and star coupler 30. The optical network unit 10A has the modules, from the warning detection module 11 to the control cell termination module 17, as shown in the figure. This configuration is similar to the configuration of the first embodiment, except that there is no processing module 13. That is, a warning condition detected by the warning detection module 11 and response detection module 12 is sent directly to the control cell generation module 14. Upon receiving this information, the control cell generation module 14 stores it in the upstream PDS-OAM cell.

The subscriber line terminal 20A consists of the control module 21, control cell generation module 22, multiplexing/demultiplexing module 23, control cell termination module 24, and processing module 25. The processing module 25 gets unit information, such as a warning or response, from the PDS-OAM cell terminated by the control cell termination module 24, checks the unit status using the unit information, and sends the result to the control module 21. The configuration of other modules is the same as that of the first embodiment.

In the second embodiment, the subscriber line terminal 20A does not need to send a warning collection request; instead, the optical network unit 10A always sends warning information. This is done simply by allocating a part the payload field in the PDS-OAM cell as a warning information field. Therefore, the optical network unit 10A sends warning information every time it sends the PDS-OAM cell.

The subscriber line terminal 20A receives a plurality of PDS-OAM cells from the optical network units 10A. It causes the processing module to get warning information from the PDS-OAM cell terminated by the control cell termination module 24 and, with this warning information, checks the unit status. Note that the only additional processing the processing module 25 must perform is to identify from which optical network unit 10A the warning information is sent. Except for this, the processing module 25 performs just as the processing module 13 in the first embodiment.

For example, the optical network unit 10A detects such errors as subscriber line signal disruptions or signal errors as well as transmission line signal disruptions or signal errors. A subscriber line refers to a signal line between the optical network unit 10A and the terminals (not shown in the figure), and a transmission line refers to an access network between the optical network units 10A and the subscriber line terminal 20A.

As an example of error monitoring, processing for a signal error in the access network is explained below. Downstream signals (SLT -->ONI), composed of continuous data, are sent in frames. The PDS-OAM cell of a frame sent from the subscriber line terminal 20A to the optical network unit 10A contains the BIP (Bit Interleaved Parity) arithmetic result of the previous frame.

The arithmetic module in the optical network unit 10A, not shown in the figure, performs the BIP arithmetic on the signals of a received frame. And, upon receiving the BIP arithmetic result of the next frame, the arithmetic module compares the result it produced with the result it received in order to detect the number of errors in the received data. The response detection module 12 sends this number of errors to the control cell generation module 14. The control cell generation module 14 stores the number of errors in the PDS-OAM cell and sends the PDS-OAM cell to the subscriber line terminal 20A.

The subscriber line terminal 20A causes the processing module 25 to accumulate the number of errors sent from each optical network unit 10A. If the accumulated number exceeds a specified threshold within a specified time, a warning is sent to the control module 21. It should be noted that a PDS-OAM cell arrives in the subscriber line terminal 20A, one cell at a time. Therefore, the processing module 25 has one arithmetic module, reads the number of errors so far accumulated for each optical network unit 10A, adds up the number of errors in the received PDS-OAM cell, and performs a sequence of operations for storing that number.

This configuration eliminates the need for each optical network unit 10A to have an addition circuit for accumulation. Only the subscriber line terminal 20 need to have such one such circuit.

In the second embodiment, the optical network unit 10A sends only warning information to the subscriber line terminal 20A which checks the status of each optical network unit 10A, thus eliminating the need for each optical network unit 10A to have the processing module. This simplifies the configuration of the optical network unit 10A and, as a result, reduces the power consumption and cost of the optical network unit 10A.

Third Embodiment

In the third embodiment, the validity check for the PDS-OAM cell is made in the optical network units and subscriber line terminal.

FIG. 5 is a diagram showing the configuration of the third embodiment of a subscriber network system according to the present invention.

The system in the figure consists of the optical network unit 10B, subscriber line terminal 20B, and star coupler 30. The optical network unit 10B has the modules, from the warning detection module 11 to the control cell termination module 17, as well as the validity check operation module 18 and the validity check verification module 19, as shown in the figure. The validity check operation module 18 performs the validity check on a PDS-OAM cell generated by the control cell generation module 14 and adds the result to the PDS-OAM cell. The validity check verification module 19 performs the validity check on a PDS-OAM cell terminated by the control cell termination module 17 and compares the produced result with the received result to verify the validity of the PDS-OAM cell.

The subscriber line terminal 20B also has the validity check operation module 26 and the validity check verification module 27, which correspond to those in the optical network unit 10B. The validity check operation module 26 and validity check verification module 27 perform processing just as the validity check operation module 18 and validity check verification module 19 in the optical network unit 10B. The validity check methods include the payload data parity check, CRC error check, and so forth. Other modules of the subscriber line terminal 20B are the same as those in the first embodiment.

Before a PDS-OAM cell is sent from the optical network unit optical network unit 10B to the subscriber line terminal 20B, the validity check operation module 18 performs the validity check on the payload data in the PDS-OAM cell and adds the result to the cell. This validity check is made, for example, by performing the BIP arithmetic operation. Then, the output control module 15 and multiplexing/demultiplexing module 16 multiplex the PDS-OAM cell and user cells, and send them to the subscriber line terminal 20B.

When the subscriber line terminal 20B receives this PDS-OAM cell, the validity check verification module 27 once holds the payload data of the PDS-OAM cell, performs the BIP arithmetic operation on the payload data, and compares the produced result with the received result. When the data is valid, the PDS-OAM cell information is sent to the control module 21; when the received data is invalid, the data held by the validity check verification module 27 is discarded and, at the same time, discard information is sent to the control module 21.

The validity check operation result is also added by the validity check operation module 26 to a PDS-OAM cell output by the subscriber line terminal 20B. Upon receiving this cell, the optical network unit 10B causes the validity check verification module 19 to perform the validity check on the PDS-OAM cell and compares the produced result with the received result. When the data is valid, a warning output request is made; when the data is invalid, the data in the PDS-OAM cell is discarded and the request is ignored. When the data is discarded, the discard information is stored in the upstream PDS-OAM cell to inform the subscriber line terminal 20B of the condition.

The system in the third embodiment of the present invention checks the validity of a PDS-OAM cell, preventing the system control operation from being performed when a PDS-OAM cell contains bit errors. In addition, the discard information, which is sent from the optical network unit 10B to the subscriber line terminal 20B, allows the subscriber line terminal 20B to check if the PDS-OAM cell has been accepted normally by the optical network unit 10B.

In the above embodiments, the PDS system is used as the subscriber network system. However, it is to be understood that the invention is not limited to the PDS system but may be applied to other systems such as a single-star configuration. In addition, there is no need for the system to have a plurality of optical network units 10 (10A, 10B); the invention have the same effect on a single-unit system.

What is claimed is:

1. A subscriber network system in which a plurality of optical network units and a subscriber line terminal, connected in a passive double star system, communicate in the ATM transmission mode using cells, each of the optical network units and the subscriber line terminal comprising:

a control cell generation module generating a PDS-OAM cell as a system control cell;

a validity check operation module performing a validity check on the PDS-OAM cell generated by the control cell generation module and adding the validity check result to the PDS-OAM cell;

a validity check verification module verifying the validity of the PDS-OAM cell received from a counterpart unit by performing a validity check on the received PDS-OAM cell and by comparing the check result with the received check result; and a control cell termination module terminating PDS-OAM cells sent from counterpart units.

2. A subscriber network system as set forth in claim 1, wherein the control generation module of the subscriber line terminal generates the PDS-OAM cell, the PDS-OAM cell including control information.

3. A subscriber network system as set forth in claim 1, wherein each of the optical network units further comprise:

a processing module performing unit status check processing based on a unit status signal detected in the optical network unit and outputting processing results to the control cell generation module for generating the PDS-OAM cell, the PDS-OAM cell including unit status information.

4. A subscriber network system as set forth in claim 1, wherein the subscriber line terminal further comprises:

a processing module performing unit status check processing, upon receiving the PDS-OAM cell indicating the unit status of an optical network unit, for the optical network unit based on the PDS-OAM cell indicating the unit status.

* * * * *